United States Patent [19]
Dixon et al.

[11] Patent Number: 5,871,318
[45] Date of Patent: Feb. 16, 1999

[54] QUICK-RELEASE TRACK FASTENER

[75] Inventors: Richard Williams Dixon; Steven R. Bell, both of Winston-Salem, N.C.

[73] Assignee: Be Aerospace, Inc., Wellington, Fla.

[21] Appl. No.: 967,827

[22] Filed: Nov. 12, 1997

[51] Int. Cl.$^6$ ...................................................... B60P 7/08
[52] U.S. Cl. ........................ 410/105; 410/104; 410/102; 410/77; 244/118.1
[58] Field of Search ..................................... 410/101, 104, 410/105, 80, 81, 77, 102; 244/118.1, 118.6, 122 R; 248/500, 503, 503.1

[56] References Cited

U.S. PATENT DOCUMENTS

| | | | |
|---|---|---|---|
| 3,282,229 | 11/1966 | Elsner ....................................... | 410/105 |
| 3,344,749 | 10/1967 | Bass et al. ............................... | 410/105 |
| 3,620,171 | 11/1971 | Brenia et al. ............................ | 410/105 |
| 3,847,344 | 11/1974 | Kulczycki et al. ....................... | 410/77 |
| 4,062,298 | 12/1977 | Weik ......................................... | 410/105 |
| 4,109,891 | 8/1978 | Grendahl ............................. | 410/105 X |
| 4,213,593 | 7/1980 | Weik ................................... | 410/105 X |
| 4,230,472 | 10/1980 | Howell ..................................... | 410/102 |
| 4,932,816 | 6/1990 | Ligensa ................................... | 410/105 |
| 5,169,091 | 12/1992 | Beroth . | |
| 5,178,346 | 1/1993 | Beroth . | |
| 5,183,313 | 2/1993 | Cunningham . | |

FOREIGN PATENT DOCUMENTS

565973 A1   10/1993   European Pat. Off. ............ 244/118.1

*Primary Examiner*—Stephen T. Gordon
*Attorney, Agent, or Firm*—Adams Law Firm, P.A.

[57] ABSTRACT

A track fastener apparatus for use with a locking track of the type used to secure a seat or cargo apparatus to the floor of a vehicle. The track fastener includes at least one locking disc sized to fit in a predetermined one of the enlarged openings in the track, and mounted for movement between an unlocked position wherein the locking disc is positioned above the enlarged opening in the track and a locked position wherein the locking disc is positioned in the enlarged openings in the track and engaged by the locking segments of the locking track adjacent the enlarged openings thereby preventing movement of the track fastener along the length of the track. A vertical bore extends through the track fastener housing and communicates with the bottom side of the track fastener housing adjacent the at least one locking disc. A lock actuator is positioned in the bore and operatively connected to the locking disc for moving the locking disc between the locked and unlocked position. The lock actuator includes a cam follower positioned in the bore in fixed relation to the track fastener housing and a cam engaged with the cam follower for translating rotational movement of the lock actuator into vertical movement of the locking disc as the cam is rotated about the cam follower. At least one locking stud is positioned on the track fastener housing to prevent vertical movement in the slot of the locking track when the locking disc is in the locked position and in unlocked relation permitting movement of the track fastener apparatus along the slot of the track when the locking stud is in the unlocked position.

26 Claims, 10 Drawing Sheets

QUICK-RELEASE TRACK FASTENER

TECHNICAL FIELD AND BACKGROUND OF THE INVENTION

This invention relates to a track fastener apparatus of the type used to anchor seats or cargo to tracks fitted to the floor of a vehicle. The particular embodiment disclosed herein is of a track fastener apparatus for securing an aircraft passenger seating unit to the floor of an aircraft. Therefore the vehicle referred to throughout this application is an aircraft. It is understood that the invention relates as well to other types of vehicles such as trains, buses or the like.

Many aircraft require the capability to be differently configured to meet varying cargo and/or passenger-carrying requirements such as the removal or addition of passenger seats and/or cargo. In addition, aircraft also must have the capability of easily and quickly relocating or reposition seats and/or cargo. It is often necessary in aircraft to change the spacing between seats to increase or decrease the passenger density throughout a portion of or the entire aircraft. For example, it may be necessary to change the density of loading of a particular aircraft from its normal first class and coach density to an all-coach configuration such as might be necessary with charter operations. In addition, some aircraft, particularly those operating on late night schedules, carry both passengers and cargo, the cargo being carried in one or more compartments normally used to carry passengers. In particular, Boeing 747's frequently fly a configuration wherein passengers occupy the fore and midsection compartments, with cargo being carried in the aft compartment.

To provide this capability, the aircraft manufacturers install locking tracks that run fore and aft along the deck of the major compartments of the aircraft. These locking tracks have a slot that runs the entire length of the track along its top side. Enlarged cut-out openings are spaced at regular intervals along the length of the track to receive portions of various types of track fasteners to permit the track fasteners to be positioned along and locked into the track in order to secure passenger seats and/or cargo which is itself secured to the track fastener. These track fasteners are adjustable within the track, thereby permitting the seats and/or cargo to be repositioned or removed.

The tracks and track fasteners are designed with safety as a paramount concern. A seat or cargo container which is not securely locked into the track is subject to sudden movement which can cause injury, structural damage to the aircraft or a substantial change in aircraft balance. The track assembly must be able to safely distribute the load to the track so that an unsafe load is not transmitted through only a few load distribution points in a manner that would cause an unsafe condition. It is also desirable for any track fastener to provide an indication of when the track fastener is properly locked to the track, so that during inspection it can be readily determined whether the track fastener is properly tightened. Any track fastener should also be capable of being easily installed on and removed from the locking track so the seats and/or cargo can be repositioned or removed quickly, safely and with minimal effort.

Attempts have been made in the past to provide the features mentioned above. For example, U.S. Pat. No. 3,847,344 discloses an apparatus for indicating when the track fastener is properly locked in the track. This is accomplished by uses of a locking wire that can be pivoted into position after the fastener has been placed in the locked position. However, the locking track fastener requires a separate distinct step in order to properly position the locking wire. In addition, the locking wire may be rotated into its partially locked position and thereby incorrectly indicate to an observer that the locking fastener is in its locked position when in fact it is not. Furthermore, the track fastener disclosed in the '344 Patent has components that engage the track and do not permit the track fastener to be readily moved lengthwise along the track since these portions must be removed from the enlarged areas of the track.

U.S. Pat. No. 4,230,432 discloses a track fastener in which a locking screw member is positioned in the housing of the track fastener in such a manner that when the track fastener is unlocked, the locking screw member extends above the top side of the track fastener and is therefore clearly visible. However, it is possible to tighten the locking wedge against the top of the track in such a way that the locking screw member does not extend above the top side of the track fastener to the same extent. The seat may seem to be securely fastened to the track, but in fact the seat will come loose quite easily upon even light stress being placed on the seat or track fastener. A cursory inspection, particularly in bad lighting conditions, might lead an inspector to incorrectly conclude that the track fastener is properly locked when in fact is it not. U.S. Pat. No. 5,183,313 discloses a two-position adjustable passenger seating system which includes a means for moving a seat a predetermined distance in fore and aft directions. A lever and a cam follower enables the spacing of the seat to be varied by moving the locking means into and out of release and engaged positions.

U.S. Pat. Nos. 5,169,091 and 5,178,346 each disclose track fasteners which use a spring-loaded actuator which is positioned in a fully released and easily visible condition unless properly locked. Both require several turns of a screw-thread actuator to move the fastener between locked and unlocked positions.

The invention of the present application provides a considerable additional measure of safety by making it impossible for the locking discs of the track fastener to be tightened to any extent unless the locking discs are properly aligned and positioned in the enlarged openings of the track for which it is intended. The invention also enables the track fastener to be quickly released and relocked with only a single turn or less of the actuator pin, instead of multiple turns required of screw-threaded track fastener locking pins.

SUMMARY OF THE INVENTION

Therefore, it is an object of the invention to provide a track fastener apparatus for a vehicle such as an aircraft, train, bus or the like.

It is an object of the invention to provide a track fastener apparatus which is quickly and easily locked and unlocked when necessary to reposition the fastener.

It is another object of the invention to provide a track fastener apparatus which is capable of being connected to a locking track quickly, safely and securely.

It is another object of the invention to provide a track fastener apparatus which provides a positive indication that it has been properly locked.

It is another object of the invention to provide a track fastener apparatus which cannot be locked to any extent unless it is properly positioned for locking.

It is another object of the invention to provide a track fastener apparatus which gives an unambiguous visual indication that locking has or has not taken place.

It is another object of the invention to provide a track fastener apparatus which distributes load evenly along the track. It is another object of the invention to provide a track fastener apparatus which can be locked to the locking track only by applying force to a locking pin, which force is effective only when the locking pin is properly positioned for locking.

It is another object of the invention to provide a track fastener apparatus which will not give a false indication that it is locked.

These and other objects of the present invention are achieved in the preferred embodiments disclosed below by providing a track fastener apparatus for use with a locking track of the type used to secure a seat or cargo apparatus to the floor of a vehicle. The upper walls of the locking track define a longitudinally-extending slot therein, the upper walls of the slot having regularly spaced-apart enlarged openings along the length thereof separated by relatively narrower track segments defining locking segments. The track fastener apparatus comprises a track fastener housing including attachment means for attachment to a seat or cargo apparatus. The track fastener housing has a top side and a bottom side with at least one locking disc on the bottom side thereof, the locking disc being sized to fit in a predetermined one of the enlarged openings in the track. The locking disc is mounted on the track fastener assembly for movement between an unlocked position wherein the locking disc is positioned above the enlarged opening in the track and a locked position wherein the locking disc is positioned in the enlarged openings in the track and engaged by the locking segments of the locking track adjacent the enlarged opening thereby preventing movement of the track fastener along the length of the track. A vertical bore extends through the track fastener housing and communicates with the bottom side of the track fastener housing adjacent the at least one locking disc. A lock actuator is positioned in the bore and operatively connected to the locking disc for moving the locking disc between the locked and unlocked position. The lock actuator includes a cam follower positioned in the bore in fixed relation to the track fastener housing and a cam engaged with the cam follower for translating rotational movement of the lock actuator into vertical movement of the locking disc as the cam is rotated about the cam follower. At least one locking stud is positioned on the bottom of the track fastener housing for being positioned in locking relation against vertical movement in the slot of the locking track when the locking disc is in the locked position and positioned in unlocked relation permitting movement of the track fastener apparatus along the slot of the track when the locking stud is in the unlocked position.

Preferably, the lock actuator comprises a locking pin positioned in the bore for rotation therein.

According to one preferred embodiment of the invention, the cam comprises a substantially helical channel and the cam follower comprises a cam follower pin positioned in the helical channel for imparting vertical movement to the locking pin as it is rotated.

According to another preferred embodiment of the invention, the helical channel extends though the locking pin and the cam follower pin is fixed diametrically in the bore and extends through the channel in the locking pin from one side of the bore to the other.

According to yet another preferred embodiment of the invention, the channel is formed in the locking pin to move the locking disc between the locked and unlocked position in less than 360 degrees of rotation of the locking pin.

According to yet another preferred embodiment of the invention, the channel is formed in the locking pin to move the locking disc between the locked and unlocked position in less than 270 degrees of rotation of the locking pin.

According to yet another preferred embodiment of the invention, the channel is formed in the locking pin to move the locking disc between the locked and unlocked position in approximately 180 degrees of rotation of the locking pin.

According to yet another preferred embodiment of the invention, detent means are providing for securing the locking pin against rotation of the locking pine in a first position where the locking disc is in the locked position and in a second position where the locking disc is in the unlocked position.

Preferably, the detent means comprises a spring-loaded detent member positioned in a hole in the track fastener housing communicating with the bore for being urged by the spring into contact with the locking pin in the bore. A first recess is formed in a side of the locking pin at a position whereby when the locking pin is in the locked position the detent member is urged by the spring into the first recess a distance sufficient to permit turning of the locking pin only when torque sufficient to overcome the resistance against radial movement of the locking pin created by the detent member is applied to the locking pin. A second recess formed in a side of the locking pin at a position whereby when the locking pin is in the unlocked position the detent member is urged by the spring into the second recess a distance sufficient to permit turning of the locking pin only when torque sufficient to overcome the resistance against radial movement of the locking pin created by the detent member is applied to the locking pin.

According to yet another preferred embodiment of the invention, the detent member comprises a ball and the first and second recesses each comprise an annular depression formed in the side wall of the locking pin.

Another preferred embodiment of the invention comprises a track fastener apparatus for use with a locking track of the type used to secure a seat or cargo apparatus to the floor of a vehicle, upper walls of the locking track defining a longitudinally-extending slot therein. The upper walls of the slot have regularly spaced-apart enlarged openings along the length thereof separated by relatively narrower track segments defining locking segments. The track fastener apparatus comprises a track fastener housing including attachment means for attachment to a seat or cargo apparatus. The track fastener housing has a top side and a bottom side with a plurality of spaced-apart locking discs on the bottom side thereof, the locking discs being sized to fit in space-apart ones of the enlarged openings in the track. The locking discs are mounted on the track fastener housing for movement between an unlocked position wherein the locking discs are positioned above the enlarged openings in the track and a locked position wherein the locking discs are positioned in the enlarged openings in the track and engaged by the locking segments of the locking track adjacent the enlarged opening thereby preventing movement of the track fastener along the length of the track. A vertical bore extends through the track fastener housing and communicates with the bottom side of the track fastener housing adjacent the at least one locking disc. A lock actuator is positioned in the bore and operatively connected to the locking discs for moving the locking discs between the locked and unlocked positions. The lock actuator includes a cam follower positioned in the bore in fixed relation to the track fastener housing and a cam engaged with the cam follower for translating rotational movement of the lock actuator into vertical movement of the locking discs as the cam is rotated about the cam follower. At least one locking stud is positioned on the bottom of the track fastener housing for being positioned in locking relation against vertical movement in the slot of the locking track when the locking discs are in the locked position and positioned in unlocked relation permitting movement of the track fastener apparatus along the slot of the track when the locking studs are in the unlocked position.

According to yet another preferred embodiment of the invention, the track fastener housing includes a plurality of spaced-apart locking studs.

According to yet another preferred embodiment of the invention, the track fastener housing includes two spaced-apart locking discs and three spaced-apart locking studs, the locking studs being positioned on opposing ends of the track fastener housing and the locking discs positioned between the locking studs.

According to yet another preferred embodiment of the invention, the lock actuator is carried by a cover plate which moves vertically into and out of locked and unlocked position with the lock actuator, and the cover plate is mounted for vertical movement on two spaced-apart guide rods which extend into guide rod holes in the track fastener housing.

According to yet another preferred embodiment of the invention, the lock actuator comprises a locking pin positioned in the bore for rotation therein.

According to yet another preferred embodiment of the invention, the cam comprises a substantially helical channel and the cam follower comprises a cam follower pin positioned in the helical channel for imparting vertical movement to the locking pin as it is rotated.

According to yet another preferred embodiment of the invention, the channel extends though the locking pin and the cam follower pin is fixed diametrically in the bore and extends through the channel in the locking pin from one side of the bore to the other.

According to yet another preferred embodiment of the invention, the channel is formed in the locking pin to move the locking disc between the locked and unlocked position in less than 360 degrees of rotation of the locking pin.

According to yet another preferred embodiment of the invention, the channel is formed in the locking pin to move the locking disc between the locked and unlocked position in less than 270 degrees of rotation of the locking pin.

According to yet another preferred embodiment of the invention, the channel is formed in the locking pin to move the locking disc between the locked and unlocked position in approximately 180 degrees of rotation of the locking pin.

According to yet another preferred embodiment of the invention, detent means are provided for securing the locking pin against rotation of the locking pin in a first position where the locking disc is in the locked position and in a second position where the locking disc is in the unlocked position.

Preferably, the detent means comprises a spring-loaded detent member positioned in a hole in the track fastener housing communicating with the bore for being urged by the spring into contact with the locking pin in the bore. A first recess is formed in a side of the locking pin at a position whereby when the locking pin is in the locked position the detent member is urged by the spring into the first recess a distance sufficient to permit turning of the locking pin only when torque sufficient to overcome the resistance against radial movement of the locking pin created by the detent member is applied to the locking pin. A second recess is formed in a side of the locking pin at a position whereby when the locking pin is in the unlocked position the detent member is urged by the spring into the second recess a distance sufficient to permit turning of the locking pin only when torque sufficient to overcome the resistance against radial movement of the locking pin created by the detent is applied to the locking pin.

According to yet another preferred embodiment of the invention, the detent member comprises a ball and the first and second recesses each comprise an annular depression formed in the side wall of the locking pin.

According to yet another preferred embodiment of the invention, visual locking indicator means are provided for visually indicating whether the track fastener apparatus is locked or unlocked.

Preferably, said visual locking indicator means comprises a first visually-perceivable object positioned on said actuator and a second visually-perceivable object positioned on said housing adjacent said bore, and further wherein the orientation of said first visually-perceivable object and said second visually-perceivable object indicates a locked or an unlocked condition of the track fastener apparatus. The objects may be shaped, textured, raised or colored to be visually observed.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE GENERAL DESCRIPTION OF ENVIRONMENT OF USE

Figure 1:
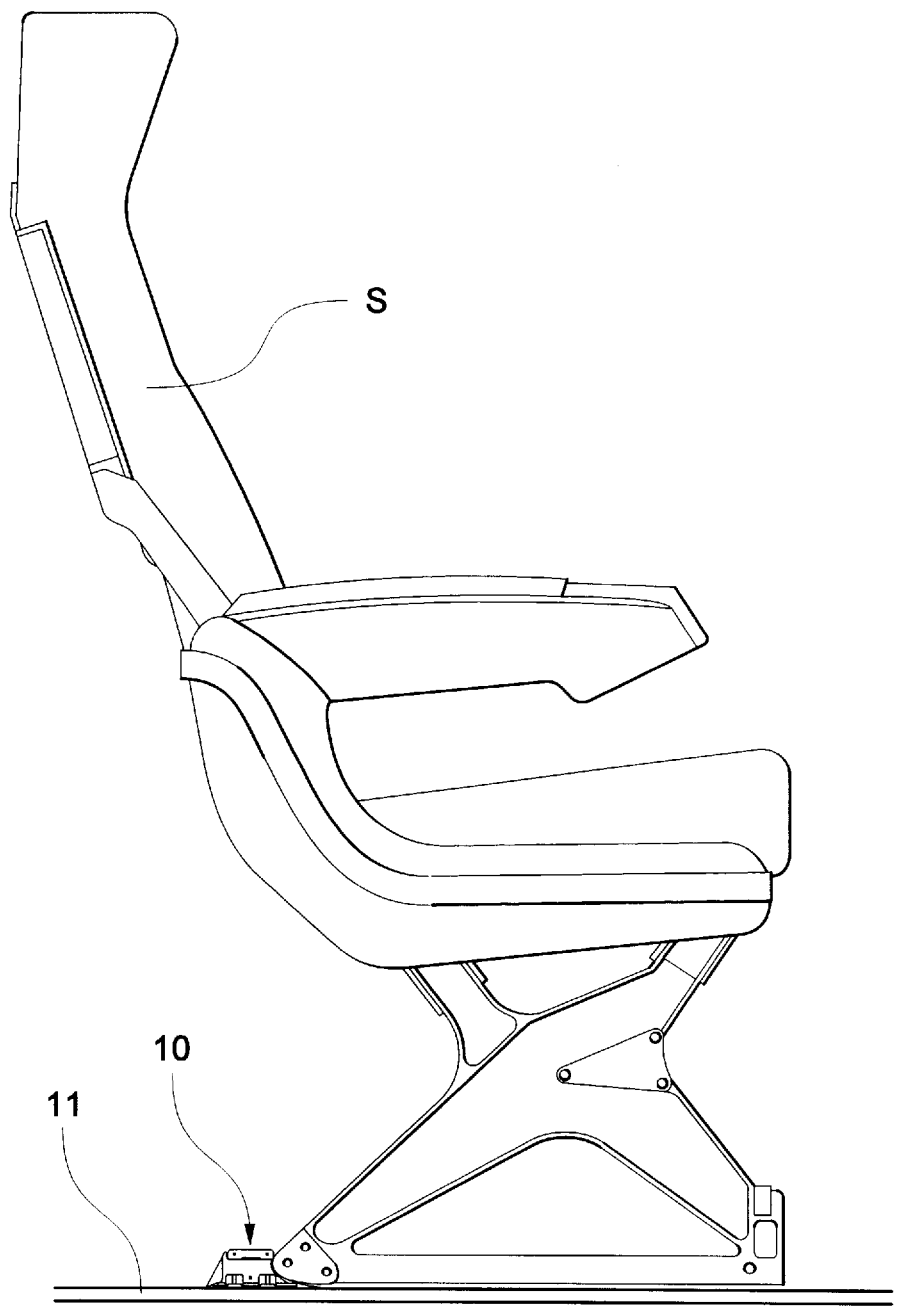
FIG. 1 is a side elevation of a typical aircraft passenger seat attached to a track fastener assembly according to an embodiment of the invention.

Referring now specifically to the drawings, a typical seating arrangement using the track fastener apparatus and track fastener assembly according to the present invention is illustrated in FIG. 1. A seating unit "S" is positioned on and locked by means of a track fastener apparatus 10 into a locking track 11. As used herein, the term track fastener apparatus refers to the track fastener 10 itself, and the term track fastener assembly refers to the combination of the track fastener 10 and the locking track 11 into which the track fastener apparatus is intended to be locked.

Locking Track

Figure 2A:
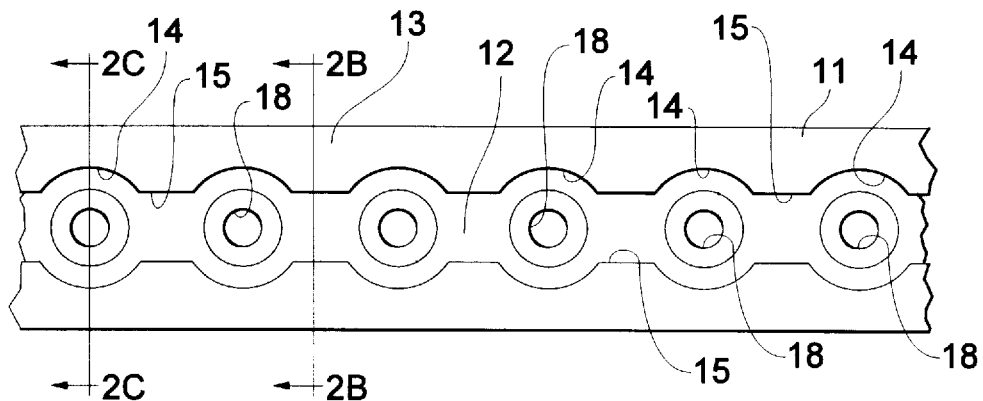
FIG. 2A is a top plan view of a length of locking track of a type usable with the invention.
Figure 2B:
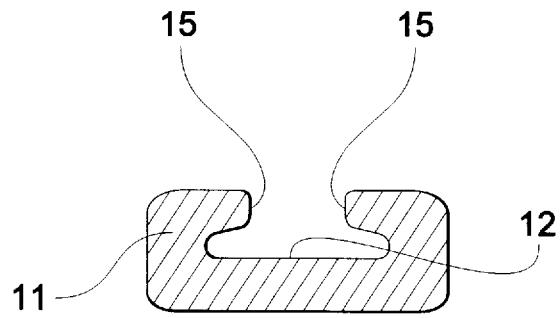
FIG. 2B is a cross-section taken through line 2B—2B of FIG. 2A.
Figure 2C:
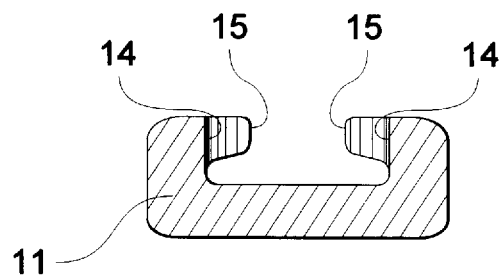
FIG. 2C is a cross-section taken through line 2C—2C of FIG. 2A.

Referring now to FIGS. 2A–2C, locking track 11 has a longitudinally-extending slot 12 therein which extends along the entire length of the locking track 11. Upper walls 13 of the locking track 11 defining the slot 12 have regularly spaced-apart enlarged openings 14 along the length thereof, separated by relatively narrower track slot segments 15 which form the portions of the structure which actually perform the locking function. This is best shown in FIG. 2B, where it is evident that the narrow track slot segments 15 extend into the slot 12 to provide undercut areas in the slot 12 beneath the slot segments 15. In contrast, the enlarged openings 14 have little or no undercut areas in the slot 12, as is shown in FIG. 2C. The locking track 11 is attached to the floor of the aircraft by machine screws through screw holes 18 in the bottom of locking track 11.

Prior Art Track Fastener

Figure 3:
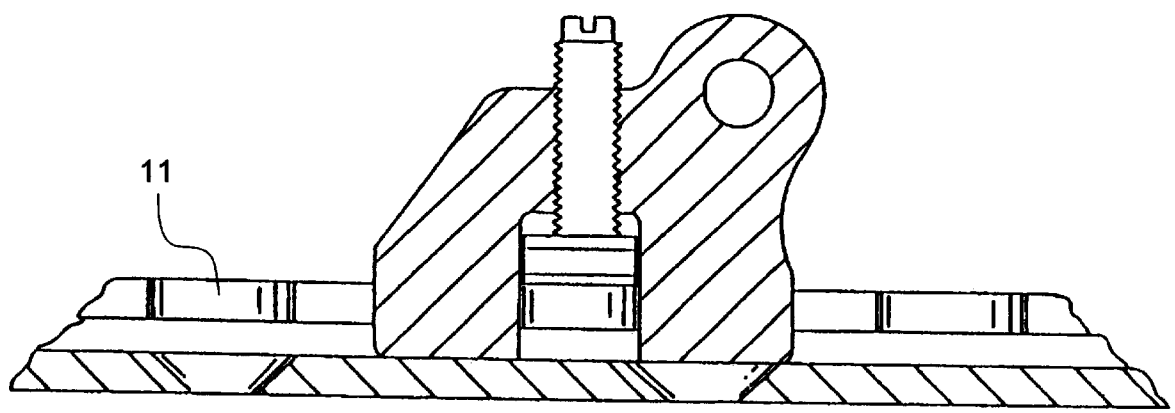
FIG. 3 is a cross-section of one form of prior art track fastener of the type wherein the locking pin has screw-threads and must be screwed into and out of the track fastener housing to lock and unlock the track fastener.

A prior art track fastener apparatus is shown in FIG. 3. Note that the bore extending from top to bottom through the housing has threads extending up to and communicating with the top exit of the bore. Thus, the screw member positioned in the bore can be tightened down into or onto the track 11 to at least some extent without regard to the alignment of the locking disc with the track. Also note that numerous turns of the screw member would be required to unlock and lock the track fastener apparatus.

Track Fastener Apparatus According to an Embodiment of the Invention

Figure 4:
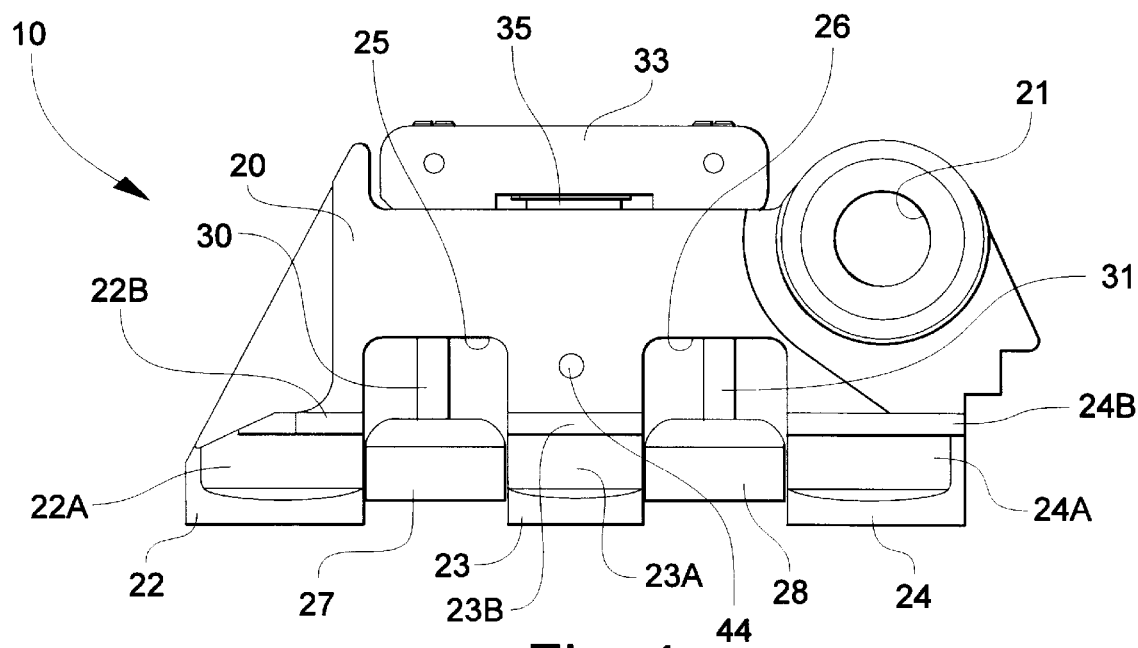
FIG. 4 is a is a side elevation of a track fastener apparatus according to one embodiment of the invention.
Figure 5:
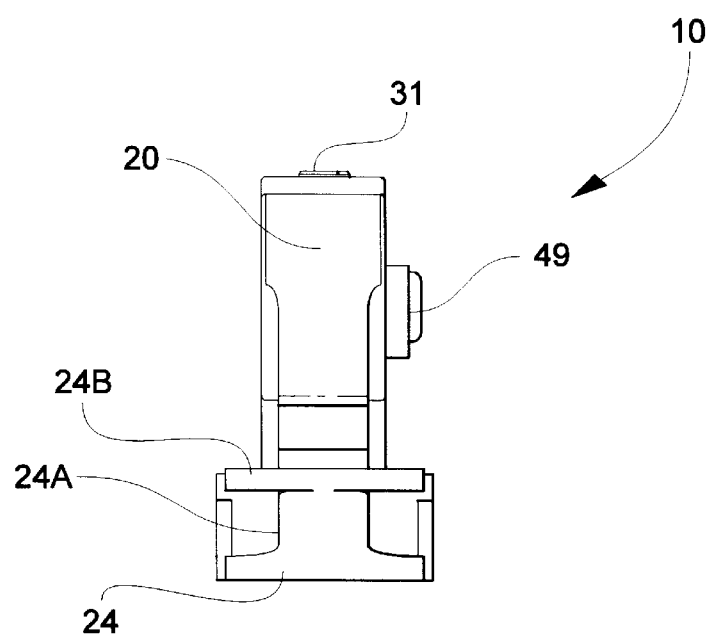
FIG. 5 is a end elevation of the track fastener apparatus shown in FIG. 4.
Figure 6:
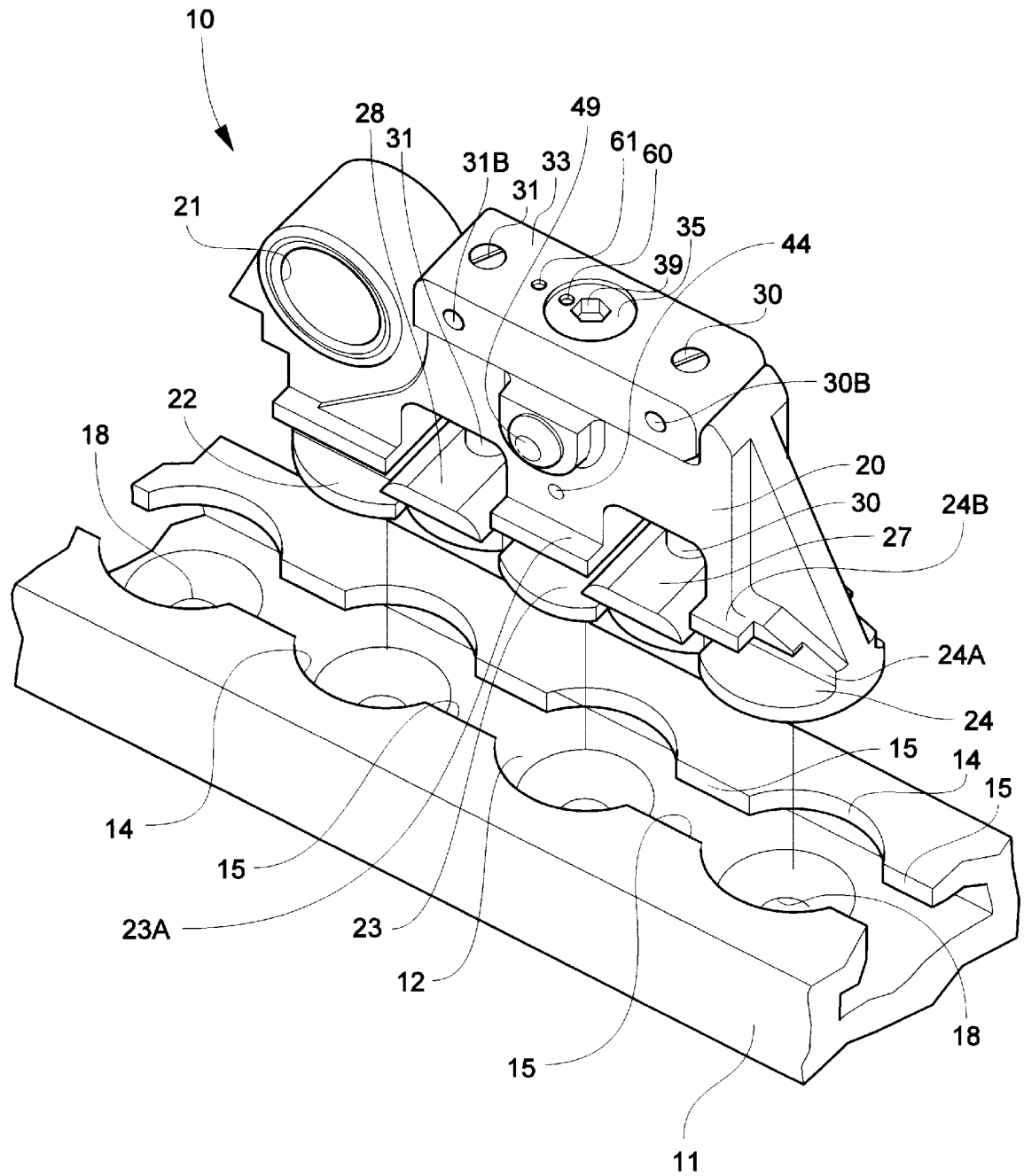
FIG. 6 is an exploded perspective view of the track fastener apparatus of FIG. 4 and the locking track of FIGS. 2A–2C.

Referring now to FIGS. 4, 5 and 6, track fastener apparatus 10 according to an embodiment of the present invention is shown. From the outside it is substantially similar in many respects to the prior art track fastener apparatus shown in FIG. 3. The track fastener apparatus 10 includes a track fastener housing 20 with integrally-formed attachment means in the form of an aperture 21 for receiving a bolt or other fastener from a seating unit such as seating unit "S"(FIG. 1), cargo container or the like so that the track fastener apparatus 10 and the seating unit, etc. are securely connected together. Track fastener apparatus 10 also includes enlarged locking studs 22, 23 and 24 integrally formed on the ends of shanks 22A, 23A, 24A. Enlarged flanges 22B, 23B and 24B vertically-spaced from the locking studs 22, 23 and 24 provide stability and an additional bearing surface between the locking track 11 and the track fastener assembly 10.

Locking studs 22, 23, 24 fit through the enlarged openings 14 of track 11 and can slide along slot 12. When the locking studs 22, 23, 24 are positioned under the narrow track slot segments 15 they are locked against vertical movement and can only be moved along the slot 12. A pair of recesses 25 and 26 in housing 20 between locking studs 22, 23 and 23, 24, respectively, receive locking discs 27 and 28. Locking discs 27 and 28 are positioned on one end of guide rods 30 and 31.

Figure 7:
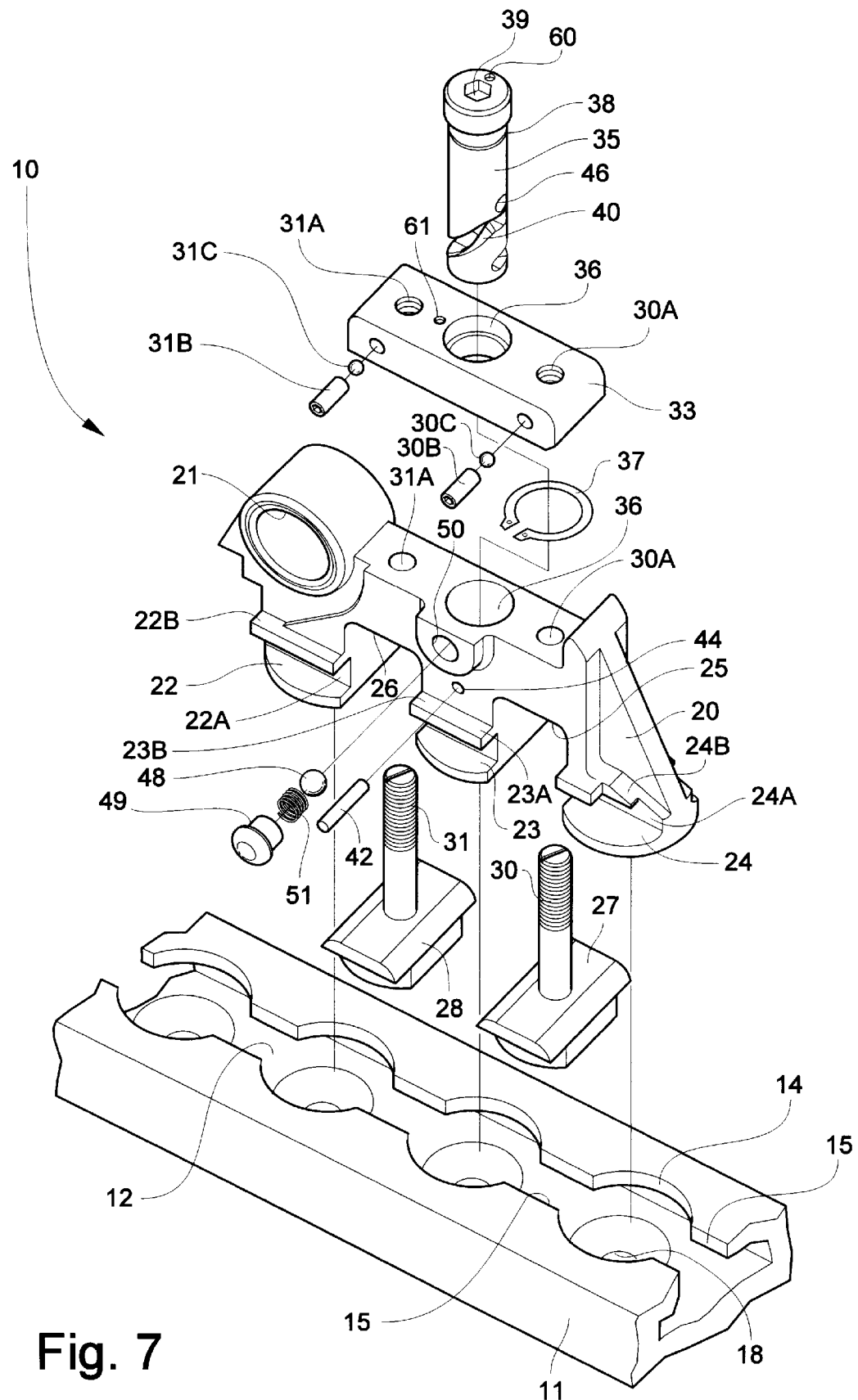
FIG. 7 is an perspective exploded view of the track fastener apparatus shown in FIG. 4.

As is best shown in FIG. 7, guide rods 30 and 31 are positioned in guide rod holes 30A and 31A, respectively, which extend vertically from the top side to the bottom side of housing 20 of track fastener apparatus 10. Guide rod holes 30A and 31A also include respective threaded segments in a cover plate 33. The guide rods 30 and 31 are fixed in position by set screws 30B and 31B and nylon retaining balls 30C and 31C. The guide rods 30 and 31 therefore are fixed to and move with the cover plate 33, and ride up and down in the unthreaded portions of the guide rod holes 30A and 30B in the track fastener housing 20. Guide rods 30 and 31 are adjustable vertically to fit various types of seat tracks.

An actuator in the form of a locking pin 35 is positioned in a vertical bore 36 which extends though the housing 20 and cover plate 33. Locking pin is held in position by a locking ring 37 which fits within an annular groove 38 in locking pin 35. See FIGS. 7 and 8. Locking pin 35 has an Allen wrench receptacle 39 or other suitable actuating mechanism formed in the upper end and is used to turn the locking pin when locking or unlocking the track fastener apparatus 10.

Still referring to FIG. 7, a cam in the form of a helical channel 40 is formed in and defined by the walls of the locking pin 35. By "helical" is meant that the channel has a simultaneous radial and longitudinal direction, without necessarily implying a "helix" shape in a purely geometrical sense. The channel 40 cooperates with a cam follower in the form of a cam follower pin 42 which is positioned in a hole 44. Hole 44 extends from one side of the track fastener housing 20 to the other and also bisects the bore 36 in the track fastener housing 20. Cam follower pin 42 therefore is positioned in the channel 40 and bisects bore 36 by defining a diameter. Cam follower pin 42 rides in the channel 40 and bears against the walls of the locking pin 35 defining the channel 40 as locking pin 35 rotates.

Figure 8:
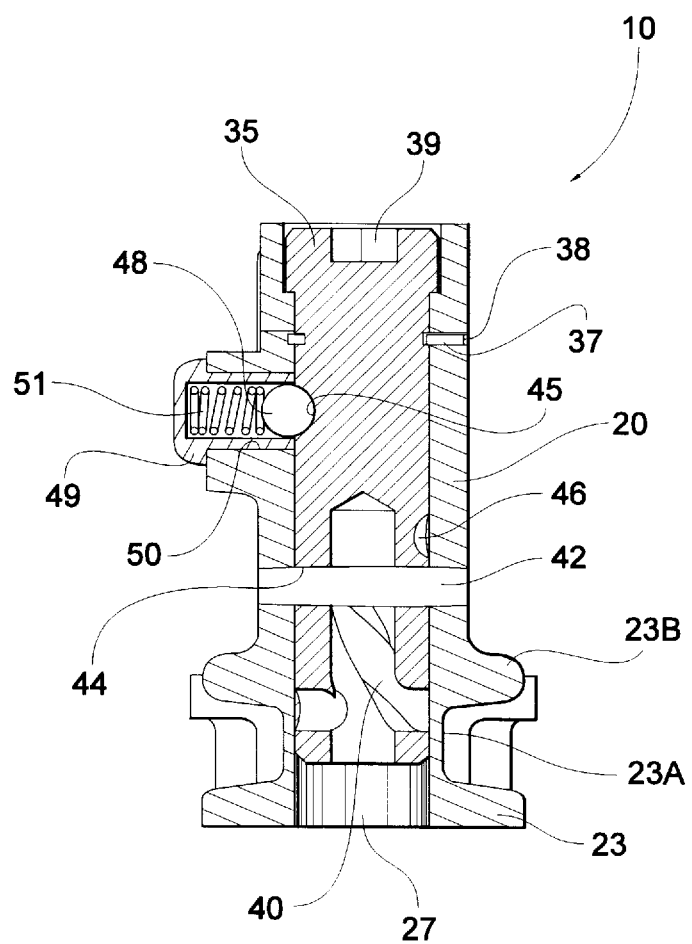
FIG. 8 is a vertical side-to-side cross-section of the track fastener apparatus shown in FIG. 4.

Locking pin 35 has a definite locked and unlocked position, and should not normally be in any other position unless in the process of moving between these two positions. To insure that the locking pin 35 is not left in any intermediate position, a detent mechanism provides positive tactile feedback, telling the technician that the track fastener assembly 10 has reached the locked or unlocked position. As is shown in FIGS. 7 and 8, locking pin 35 is provided with a pair of radially and longitudinally spaced-apart recesses 45 and 46 in its surface. A steel ball 48 is positioned in a sleeve 49 carried in a hole 50 which perpendicularly intersects bore 36 and is loaded by a spring 51 held in position by the closed end of the sleeve 49. As shown in FIG. 8, when the locking disc 27 is in the fully locked position, ball 48 fits into the recess 45. The technician can feel and hear the ball 48 snap into the recess 45, thus insuring that full locking as taken place. In addition, the force with which the ball 48 is urged into the recess 45 secures the locking pin 35 against inadvertent rotation and "creep" caused by vibration. The ball 48 can be forced out of the recess 45 by a moderate amount of torque, and as rotation continues the ball 48 rides on the surface of the locking pin 35 until the recess 46 reaches the position of the ball 48. As the ball 48 is urged by the spring 51 into the recess 46, the same tactile and auditory response as described above is created and assists the technician in determining that the track fastener assembly 10 is completely unlocked and can be removed.

Finally, the track fastener 10 includes a visual indicator that the fastener 10 is properly locked into place. The top axial surface of actuator 35 includes a small depression 60 filled with a bright-colored paint, such as red or orange, which is easily visible. The cover plate 33 also includes a small depression 61 filled with an easily visible paint. When the fastener 10 is properly locked the two depressions 60 and 61 align with each other as shown in FIG. 6. If the fastener 10 is not properly locked, the two depressions 60, 61 are not aligned as in FIG. 6 and offer a clear visual indication that a correction in the attachment of the fastener 10 must be made.

Installation and Use of the Track Fastener Apparatus

Figure 9:
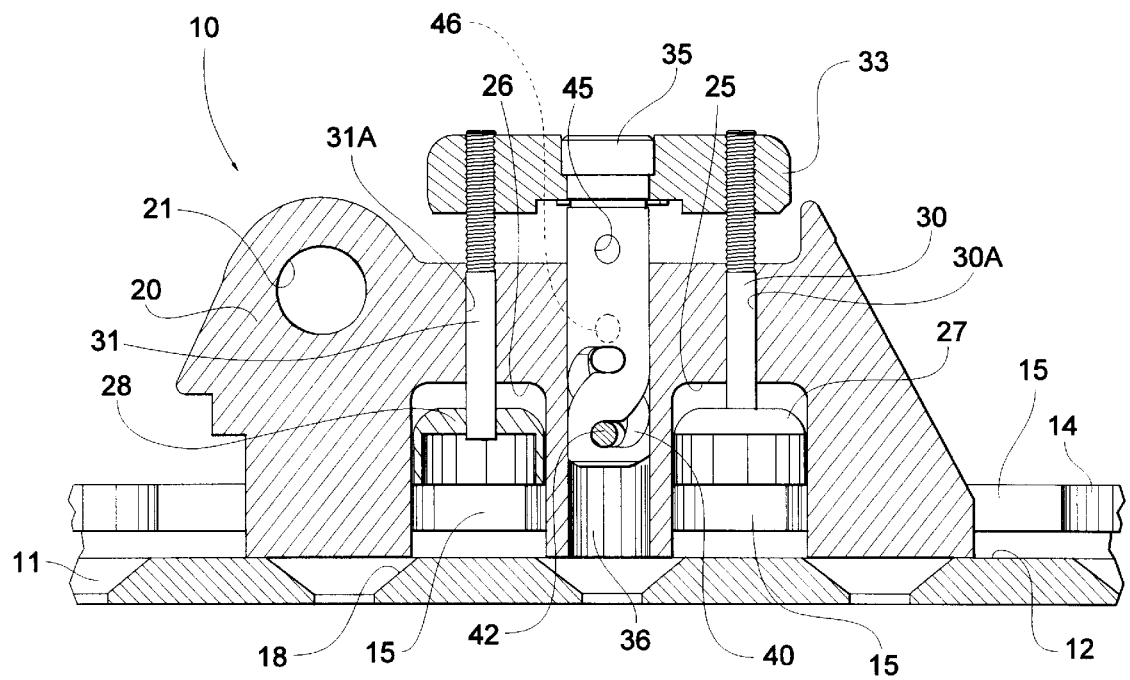
FIG. 9 is a vertical ene-to-end cross-section of the track fastener apparatus in a position on the locking track where it cannot be locked into position.
Figure 10:
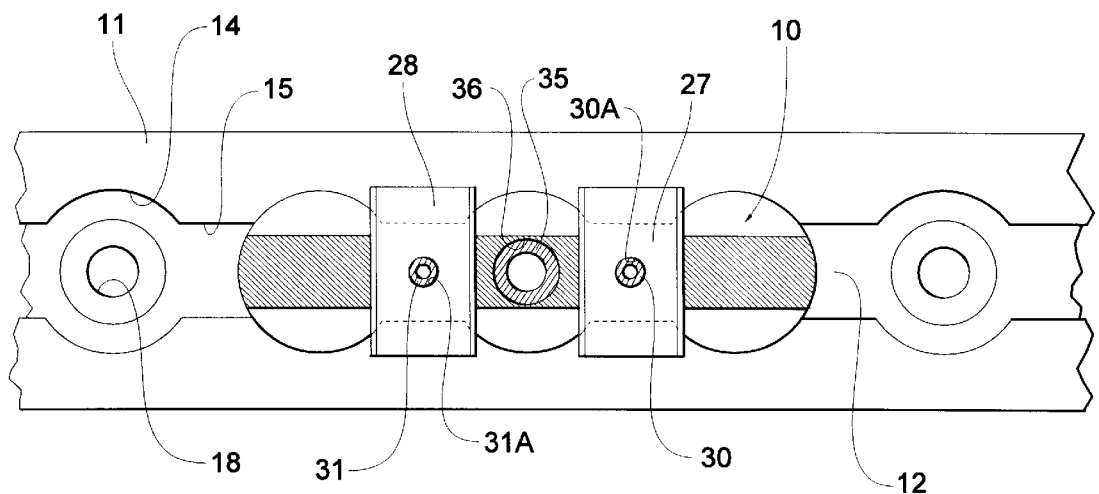
FIG. 10 is a is a horizontal cross-section of the view in FIG. 9.

FIG. 9 illustrates the position when the track fastener apparatus 10 is placed in the locking track 11. Locking studs 22, 23 and 24 are placed into three adjacent enlarged openings 14 in locking track 11. In this position, the track fastener apparatus 10 may be removed from the locking track 11 by lifting the track fastener apparatus 10 vertically out of the track 11, or the track fastener apparatus 10 may be slid along the track 11 in order to achieve proper adjustment. As is shown in FIGS. 9 and 10, locking studs 22, 23, 24 are aligned with enlarged openings 14, and the locking discs 23 and 24 are sitting on top of one of the narrow track slot segments 15. See FIG. 10. With locking discs 27 and 28 in this position, locking pin 35 cannot be rotated to the lock position described above.

Figure 11:
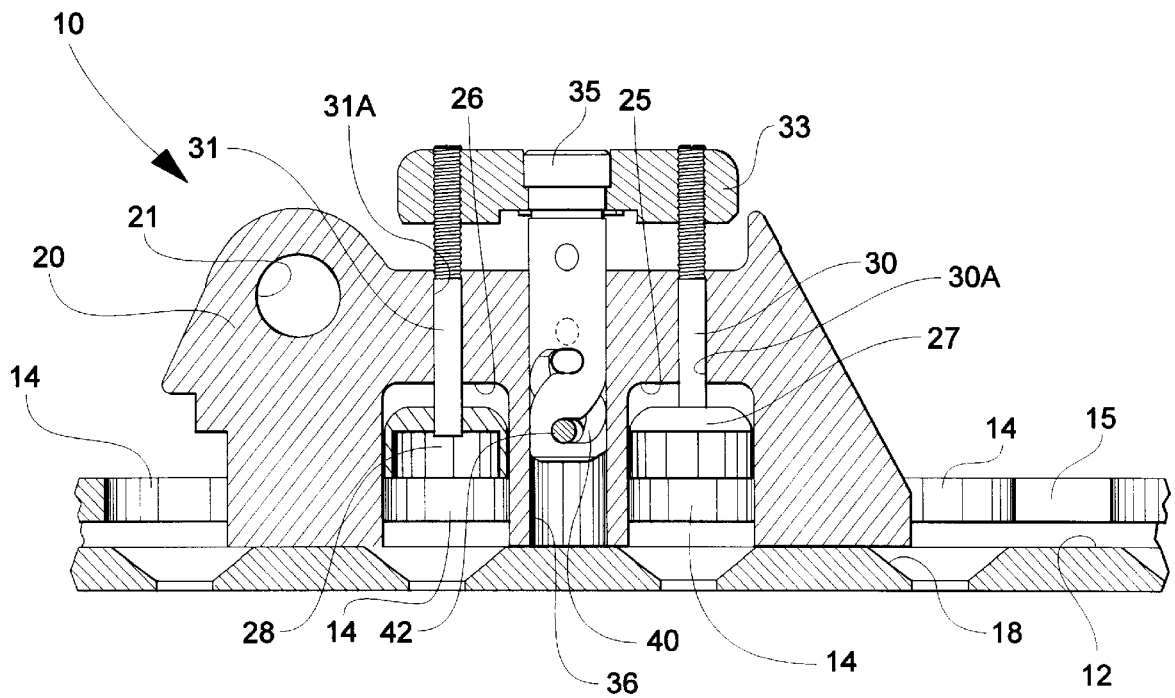
FIG. 11 is a vertical ene-to-end cross-section of the track fastener apparatus in a position on the locking track where it can be locked into position.
Figure 12:
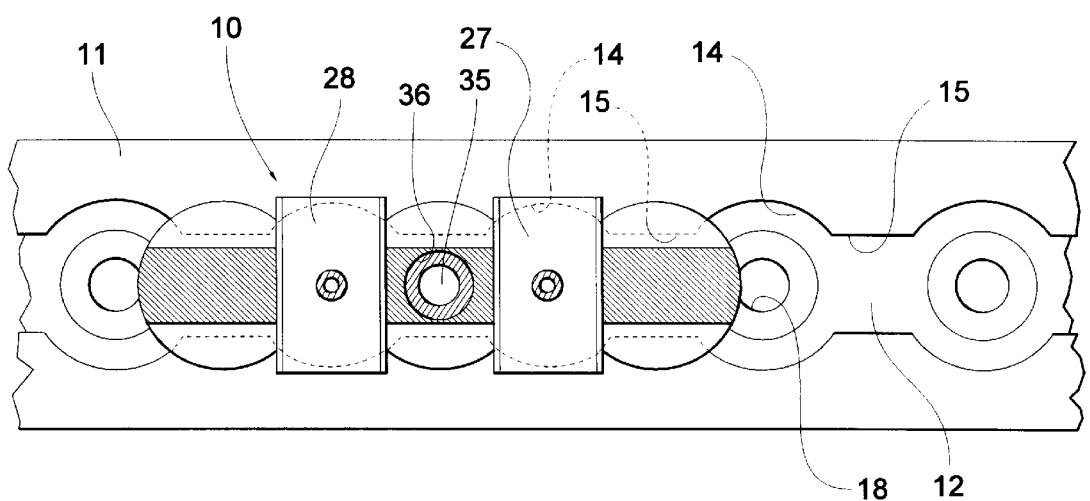
FIG. 12 is a is a horizontal cross-section of the view in FIG. 11.
Figure 13:
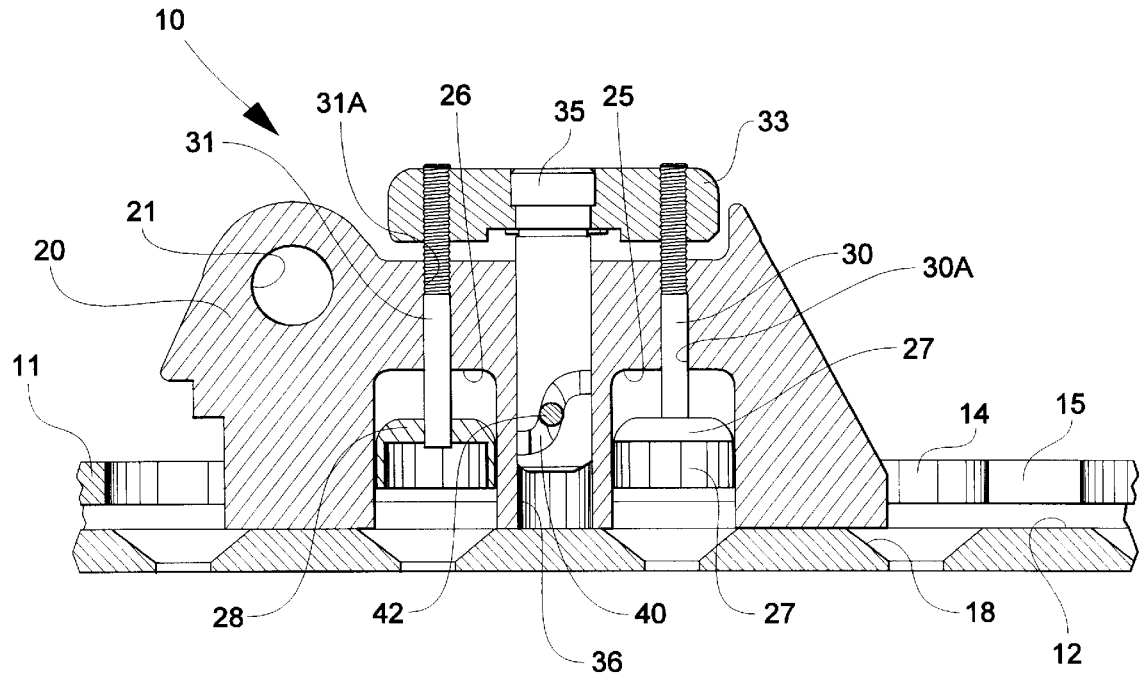
FIGS. 13 and 14 show the track fastener apparatus in intermediate (FIG. 13) and final (FIG. 14) locking position.
Figure 14:
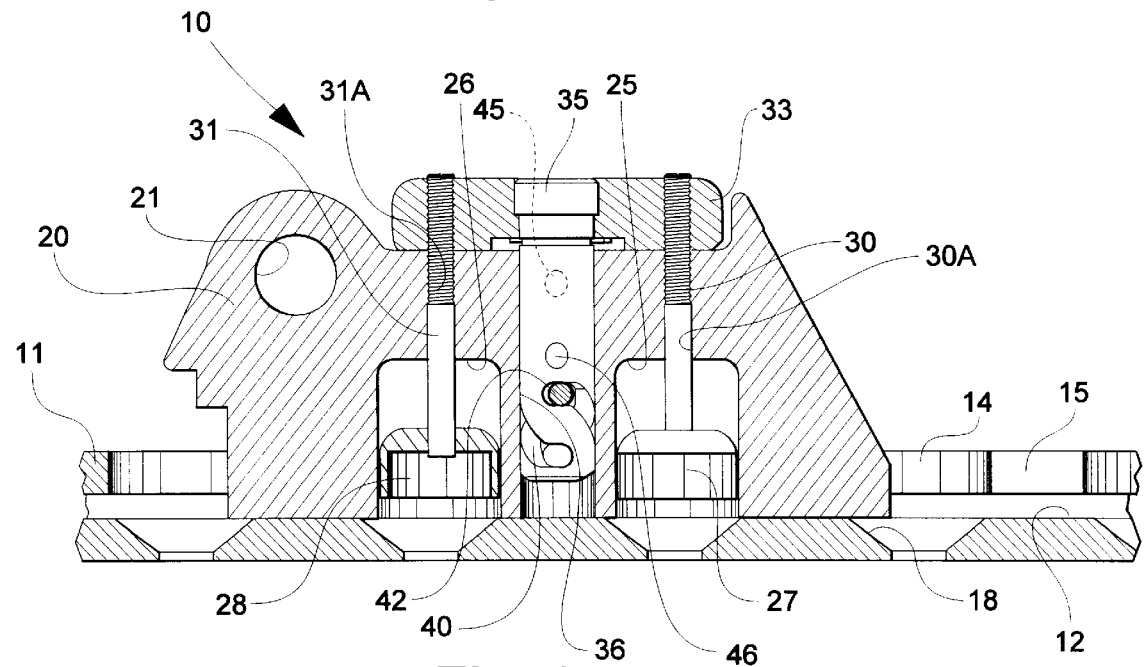

Referring now to FIGS. 11 and 12, track fastener apparatus 10 is slid along the track 11 to a point where the locking studs 22, 23 and 24 are positioned under respective adjacent narrow track slot segments 15. This alignment also has the effect of positioning the locking discs 27 and 28 directly over and in alignment with two of the enlarged openings 14 separating the two adjacent narrow track slot segments 15. As is shown in FIGS. 13 and 14, with locking discs 27 and 28 positioned over enlarged openings 14, the locking pin 35 can now be rotated to its full locked position. Compare the position of the cam follower pin 42 in the channel 40 in FIGS. 11 (full unlocked position), FIG. 13 (intermediate position) and FIG. 14 (full locked position).

In contrast to known prior art devices, the track fastener assembly 10 can be moved from full lock to full unlocked position with only about a 180 degree turn rather than with many turns of a threaded locking pin. It has been determined that a channel 40 having a pitch sufficient to provide full lock to full unlock movement within approximately 180 degree of turn provides a proper balance of torque required to rotate the locking pin 35 and amount of vertical movement between the locked and unlocked positions. Other channel configurations are possible. In addition, the number and spacing of the locking studs and locking discs may be varied. For example, in some applications a single locking disc positioned between two locking studs may provide adequate locking strength.

A track fastener apparatus is described above. Various details of the invention may be changed without departing from its scope. Furthermore, the foregoing description of the preferred embodiment the invention and the best mode for practicing the invention are provided for the purpose of illustration only and not for the purpose of limitation—the invention being defined by the claims.

I claim:

1. A track fastener apparatus for use with a locking track of the type used to secure a seat or cargo apparatus to the floor of a vehicle, upper walls of said locking track defining a longitudinally-extending slot therein, the upper walls of the slot having regularly spaced-apart enlarged openings along the length thereof separated by relatively narrower track segments defining locking segments, said track fastener apparatus comprising:

(a) a track fastener housing including attachment means for attachment to a seat or cargo apparatus;

(b) said track fastener housing having a top side and a bottom side with at least one locking disc on said bottom side thereof, said locking disc being sized to fit in a predetermined one of said enlarged openings in the track, said locking disc mounted on said track fastener assembly for movement between an unlocked position wherein the locking disc is positioned above the enlarged opening in the track and a locked position wherein said locking disc is positioned in said enlarged openings in the track and engaged by the locking segments of the locking track adjacent the enlarged opening thereby preventing movement of the track fastener along the length of the track;

(c) a vertical bore extending through the track fastener housing and communicating with the bottom side of the track fastener housing adjacent said at least one locking disc;

(d) a lock actuator positioned in said bore and operatively connected to said locking disc for moving said locking disc between the locked and unlocked position, said lock actuator including:

(i) a cam follower positioned in said bore in fixed relation to said track fastener housing; and (ii) a cam engaged with said cam follower for translating rotational movement of said lock actuator into vertical movement of said locking disc as the cam is rotated about the cam follower; and (e) at least one locking stud positioned on the bottom of the track fastener housing for being positioned in locking relation against vertical movement in the slot of the locking track when the locking disc is in the locked position and positioned in unlocked relation permitting movement of the track fastener apparatus along the slot of the track when the locking stud is in the unlocked position.

2. A track fastener apparatus according to claim 1, wherein said lock actuator comprises a locking pin positioned in said bore for rotation therein.

3. A track fastener apparatus according to claim 2, wherein said cam comprises a substantially helical channel and said cam follower comprises a cam follower pin positioned in said helical channel for imparting vertical movement to said locking pin as it is rotated.

4. A track fastener apparatus according to claim 3, wherein said helical channel extends through said locking pin and said cam follower pin is fixed diametrically in said bore and extends through the channel in said locking pin from one side of the bore to the other.

5. A track fastener apparatus according to claim 4, wherein said channel is formed in said locking pin to move the locking disc between the locked and unlocked position in less than 360 degrees of rotation of said locking pin.

6. A track fastener apparatus according to claim 4, wherein said channel is formed in said locking pin to move the locking disc between the locked and unlocked position in less than 270 degrees of rotation of said locking pin.

7. A track fastener apparatus according to claim 4, wherein said channel is formed in said locking pin to move the locking disc between the locked and unlocked position in approximately 180 degrees of rotation of said locking pin.

8. A track fastener apparatus according to claim 2 including detent means for securing said locking pin against rotation of the locking pin in a first position where said locking disc is in the locked position and in a second position where said locking disc is in the unlocked position.

9. A track fastener apparatus according to claim 8, wherein said detent means comprises:
   (a) a spring-loaded detent member positioned in a hole in said track fastener housing communicating with said bore for being urged by said spring into contact with the locking pin in said bore;
   (b) a first recess formed in a side of the locking pin at a position whereby when the locking pin is in the locked position the detent member is urged by the spring into the first recess a distance sufficient to permit turning of the locking pin only when torque sufficient to overcome the resistance against radial movement of the locking pin created by the detent member is applied to the locking pin; and
   (c) a second recess formed in a side of the locking pin at a position whereby when the locking pin is in the unlocked position the detent member is urged by the spring into the second recess a distance sufficient to permit turning of the locking pin only when torque sufficient to overcome the resistance against radial movement of the locking pin created by the detent member is applied to the locking pin.

10. A track fastener apparatus according to claim 9 wherein said detent member comprises a ball and said first and second recesses each comprise an annular depression formed in the side wall of said locking pin.

11. A track fastener apparatus for use with a locking track of the type used to secure a seat or cargo apparatus to the floor of a vehicle, upper walls of said locking track defining a longitudinally-extending slot therein, the upper walls of the slot having regularly spaced-apart enlarged openings along the length thereof separated by relatively narrower track segments defining locking segments, said track fastener apparatus comprising:
   (a) a track fastener housing including attachment means for attachment to a seat or cargo apparatus;
   (b) said track fastener housing having a top side and a bottom side with a plurality of spaced-apart locking discs on said bottom side thereof, said locking discs being sized to fit in space-apart ones of said enlarged openings in the track, said locking discs mounted on said track fastener housing for movement between an unlocked position wherein the locking discs are positioned above the enlarged openings in the track and a locked position wherein said locking discs are positioned in said enlarged openings in the track and engaged by the locking segments of the locking track adjacent the enlarged opening thereby preventing movement of the track fastener along the length of the track;
   (c) a vertical bore extending through the track fastener housing and communicating with the bottom side of the track fastener housing adjacent at least one of said locking discs;
   (d) a lock actuator positioned in said bore and operatively connected to said locking discs for moving said locking discs between the locked and unlocked positions, said lock actuator including:
      (i) a cam follower positioned in said bore in fixed relation to said track fastener housing; and
      (ii) a cam engaged with said cam follower for translating rotational movement of said lock actuator into vertical movement of said locking discs as the cam is rotated about the cam follower; and
   (e) at least one locking stud positioned on the bottom of the track fastener housing for being positioned in locking relation against vertical movement in the slot of the locking track when the locking discs are in the locked position and positioned in unlocked relation permitting movement of the track fastener apparatus along the slot of the track when the locking stud are in the unlocked position.

12. A track fastener apparatus according to claim 11, wherein said track fastener housing includes a plurality of spaced-apart locking studs.

13. A track fastener apparatus according to claim 11, wherein said track fastener housing includes two spaced-apart locking discs and three spaced-apart locking studs, at least two said locking studs being positioned on opposing ends of said track fastener housing and said locking discs positioned between respective ones of said locking studs.

14. A track fastener apparatus according to claim 11, wherein said lock actuator is carried by a cover plate which moves vertically into and out of a locked and unlocked position with said lock actuator, and wherein said cover plate is mounted for vertical movement on two spaced-apart guide rods which extend into guide rod holes in said track fastener housing.

15. A track fastener apparatus according to claim 11, wherein said lock actuator comprises a locking pin positioned in said bore for rotation therein.

16. A track fastener apparatus according to claim 15, wherein said cam comprises a substantially helical channel and said cam follower comprises a cam follower pin positioned in said helical channel for imparting vertical movement to said locking pin as it is rotated.

17. A track fastener apparatus according to claim 16, wherein said channel extends through said locking pin and said cam follower pin is fixed diametrically in said bore and extends through the channel in said locking pin from one side of the bore to the other.

18. A track fastener apparatus according to claim 17, wherein said channel is formed in said locking pin to move the locking discs between the locked and unlocked position in less than 360 degrees of rotation of said locking pin.

19. A track fastener apparatus according to claim 17, wherein said channel is formed in said locking pin to move the locking discs between the locked and unlocked position in less than 270 degrees of rotation of said locking pin.

20. A track fastener apparatus according to claim 17, wherein said channel is formed in said locking pin to move the locking discs between the locked and unlocked position in approximately 180 degrees of rotation of said locking pin.

21. A track fastener apparatus according to claim 15, and including detent means for securing said locking pin against rotation of the locking pin in a first position where said locking discs are in the locked position and in a second position where said locking discs are in the unlocked position.

22. A track fastener apparatus according to claim 21, wherein said detent means comprises:
   (a) a spring-loaded detent member positioned in a hole in said track fastener housing communicating with said bore for being urged by said spring into contact with the locking pin in said bore;

(b) a first recess formed in a side of the locking pin at a position whereby when the locking pin is in the locked position the detent member is urged by the spring into the first recess a distance sufficient to permit turning of the locking pin only when torque sufficient to overcome the resistance against radial movement of the locking pin created by the detent member is applied to the locking pin; and (c) a second recess formed in a side of the locking pin at a position whereby when the locking pin is in the unlocked position the detent member is urged by the spring into the second recess a distance sufficient to permit turning of the locking pin only when torque sufficient to overcome the resistance against radial movement of the locking pin created by the detent member is applied to the locking pin.

23. A track fastener apparatus according to claim 22, wherein said detent member comprises a ball and said first and second recesses each comprise an annular depression formed in the side wall of said locking pin.

24. A track fastener apparatus according to claim 21, and including visual locking indicator means for visually indicating whether the track fastener apparatus is locked or unlocked.

25. A track fastener apparatus according to claim 11, and including visual locking indicator means for visually indicating whether the track fastener apparatus is locked or unlocked.

26. A track fastener apparatus according to claim 25, wherein said visual locking indicator means comprises a first visually-perceivable object positioned on said actuator and a second visually-perceivable object positioned on said housing adjacent said bore, and further wherein the orientation of said first visually-perceivable object and said second visually-perceivable object indicates a locked or an unlocked condition of the track fastener apparatus.

\* \* \* \* \*